(12) United States Patent
Liu

(10) Patent No.: US 7,097,182 B1
(45) Date of Patent: Aug. 29, 2006

(54) COLLAPSIBLE UTILITY CART

(76) Inventor: Zhi jun Liu, Dahuang, Yinzhu Town, Jiaonan City, Qingdao (CN) 266431

( * ) Notice: Subject to any disclaimer, the term of this patent is extended or adjusted under 35 U.S.C. 154(b) by 0 days.

(21) Appl. No.: 10/925,453

(22) Filed: Aug. 24, 2004

(51) Int. Cl.
*B62K 15/00* (2006.01)

(52) U.S. Cl. ............... 280/42; 280/638; 280/639; 280/655; 280/656

(58) Field of Classification Search ........ 280/47.371, 280/47.315, DIG. 11, 47.34, 401, 491.1, 280/491.4, 79.2, 79.3, 79.11, 656, 652, 655, 280/655.1, 42; 160/377; 5/240, 99.1; 206/600, 206/749

See application file for complete search history.

(56) References Cited

U.S. PATENT DOCUMENTS

| | | | |
|---|---|---|---|
| 611,675 A | 10/1898 | Brookmeyer | |
| 2,422,331 A | 6/1947 | Bates | |
| 2,459,245 A * | 1/1949 | Seward | 280/515 |
| 2,725,242 A * | 11/1955 | Peplin | 280/204 |
| 2,800,335 A | 7/1957 | Clapp | |
| 2,995,386 A * | 8/1961 | Peterson | 280/491.4 |
| 3,135,527 A | 6/1964 | Knapp | |
| 3,427,045 A * | 2/1969 | Hoock | 280/478.1 |
| 3,612,600 A | 10/1971 | Sallichs | |
| 3,722,904 A | 3/1973 | Puckett | |
| 3,806,162 A * | 4/1974 | Milner | 280/502 |
| 3,837,674 A * | 9/1974 | Rathsack | 280/416.3 |
| 3,938,830 A * | 2/1976 | Lane | 280/493 |
| 4,109,933 A | 8/1978 | O'Brian | |
| 4,138,140 A | 2/1979 | O'Brian et al. | |
| 4,669,743 A | 6/1987 | Tipke | |
| 4,768,806 A | 9/1988 | Tetreault | |
| 4,856,810 A | 8/1989 | Smith | |
| 4,878,682 A | 11/1989 | Lee | |
| 5,340,134 A | 8/1994 | Dodson | |
| 5,810,375 A * | 9/1998 | Hoffarth et al. | 280/47.31 |
| 2004/0065768 A1 * | 4/2004 | Parker | 242/557 |

OTHER PUBLICATIONS

Homestead Helpers: Accessories for Rolling Delight Wagons, http://pampatike.com/access.html, Apr. 7, 2003.*

* cited by examiner

*Primary Examiner*—Christopher P. Ellis
*Assistant Examiner*—Vaughn T. Coolman
(74) *Attorney, Agent, or Firm*—Jack C. Munro

(57) ABSTRACT

A collapsible utility cart that is composed of a pair of a plurality of interconnected frames that when in the usage state assumes a box-like configuration mounted on a plurality of wheels. There is a handle assembly that is mounted to the frames with this handle assembly being movable between an extended position and a retracted position. The frames that make up the utility cart body are to be collapsed in juxtaposition when in a collapsed position and said handle assembly is to be positioned against the frames when in the retracted position.

5 Claims, 5 Drawing Sheets

COLLAPSIBLE UTILITY CART

BACKGROUND OF THE INVENTION

1. Field of the Invention

The present invention is directed to a utility cart and more particularly to a utility cart that is collapsible.

2. Description of the Related Art

There has long been known a substantial number of different transporting structures in the materials handling art. One such transporting structure is known as a utility cart. The utility cart is designed to be pulled by a handle by a user. Generally, the utility carts are useful when a user wishes to transport small items of cargo over a relatively short distance.

Utility carts find utility in both residences and commercial establishments. Typically, such a cart may be commonly used in conjunction with nurseries where it is desirable to transport potted plants from their location within the nursery to a purchaser's car or truck. Utility carts can also be of benefit when utilized in conjunction with homes where a homeowner can use the cart when performing of yard work such as planting of plants.

It is desirable in the constructing of such carts that in order to decrease the amount of space that the cart takes up during non-usage is to have the cart to be collapsible. In the past, the collapsing of such carts has not been to where the cart really assumes a minimal amount of space. It would be desirable to construct the cart to where a minimum amount of space is utilized in the collapsed position.

SUMMARY OF THE INVENTION

The basic embodiment of collapsible utility cart of the present invention comprises a bottom panel composed of a first base frame member and a second base frame member and a first bottom frame member and a second bottom frame member. The first bottom frame member is pivotally attached to the first base frame member. The second bottom frame member is pivotally attached to the second bottom frame member. The bottom panel is movable between an extended position and a collapsed position. The first bottom frame member being aligned with the second bottom frame member when in the extended position. The first bottom frame member being side-by-side with the second bottom frame member when in the collapsed position. A plurality of wheels are mounted on the base frame members. A first side panel frame is attached to the first base frame member. A second side panel frame is attached to the second base frame member. The first side panel frame being spaced a maximum distance from the second side panel frame when in the extended position. The first side panel frame located side-by-side with the first bottom frame member and the second side panel frame located side-by-side with the second bottom frame member when in the collapsed position. The utility cart includes a handle assembly defined as a first bar mounted about a first horizontal axis to the first base frame member. A second bar is mounted about a second horizontal axis to the second base frame member, the outer ends of both the first bar and the second bar are mounted to a first connector. A lower handlebar is pivotally mounted about a third horizontal axis to the first connector. When in the extended position the first bar forms almost a right angle with the second bar. When in the collapsed position the first bar being in juxtaposition with the second bar with both the first bar and the second bar capable of being located against the first bottom frame member and the second bottom frame member.

A further embodiment of the present invention is where the first basic embodiment is modified by the first bottom frame member being identical in size to the second bottom frame member.

A further embodiment of the present invention is where the first basic embodiment is modified by the first side panel frame being identical in size to the second side panel frame.

A further embodiment of the present invention is where the first basic embodiment is modified by defining that the first horizontal axis is located parallel to the second horizontal axis.

A further embodiment of the present invention is where the just previous embodiment is modified by defining that the third horizontal axis is oriented perpendicular to the first horizontal axis and the second horizontal axis.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF THE INVENTION

Figure 1:
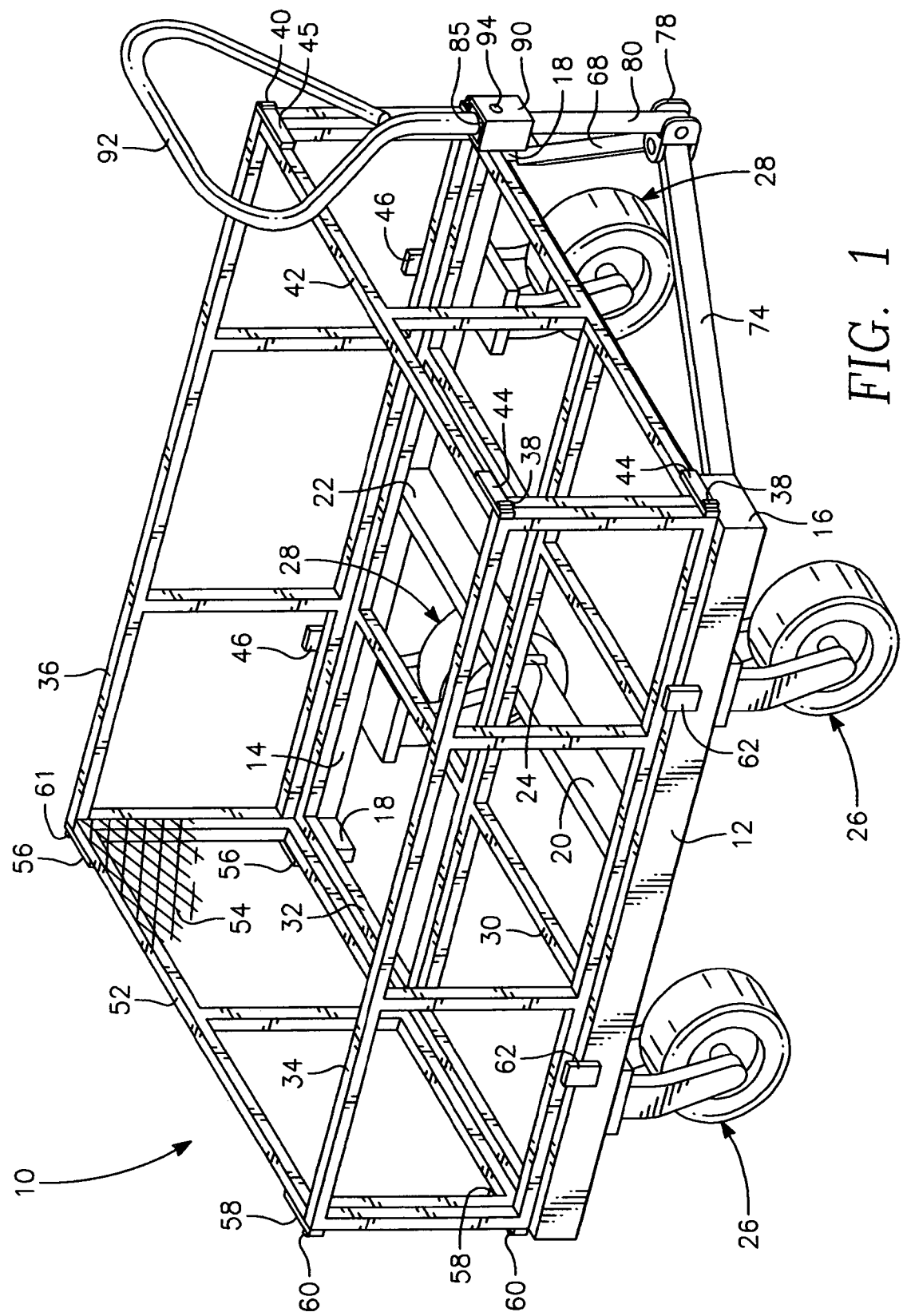
FIG. 1 is an isometric view of the collapsible utility cart of the present invention showing the utility cart in its expanded and usage position.

Referring particularly to the drawings, there is shown a utility cart 10 of this invention. The collapsible utility cart 10 includes a pair of parallel spaced apart base frame members defined as a first base frame member 12 and a second base frame member 14. Base frame member 12 terminates at each end in a turned in end 16. Base frame member 14 terminates at each end in a turned in end 18. The turned in ends 16 face the turned in ends 18.

Fixedly secured to the inside surface of base frame member 12 is a bracket 19. Pivotally attached to the bracket 19 is a cross brace member 20. Fixedly secured to the inside surface of base frame member 14 is a bracket 21. Pivotally attached to the bracket 21 is a cross brace member 22. The cross brace members 20 and 22 are pivotally connected together at pivot joint 24. Fixedly mounted to the undersurface of the base frame member 12 are a pair of spaced apart caster wheel assemblies 26. Fixedly mounted to the undersurface of the base frame member 14 are a similar pair of caster wheel assemblies 28. The wheels 26 and 28 that are located at the front of the cart 10 are capable of three-hundred sixty degree turning movement plus normal rotational movement. The wheels 26 and 28 that are located at the back of the cart 10 are not capable of turning plus normal rotational movement.

Hingedly mounted by lineal hinge 31 to the inside surface of the base frame member 12 is a first bottom frame member 30. Hingedly connected by lineal hinge 33 to the inside surface of the base frame member 14 is a second bottom frame member 32. The bottom frame members 30 and 32 are of the same size and each are constructed of a plurality of rigid lineal interconnected bar members. The basic overall shape of each of the bottom frame members 30 and 32 are rectangular in configuration. The bottom frame members 30 and 32 will be covered with a screening layer (metal or plastic), which is not shown.

Figure 2:
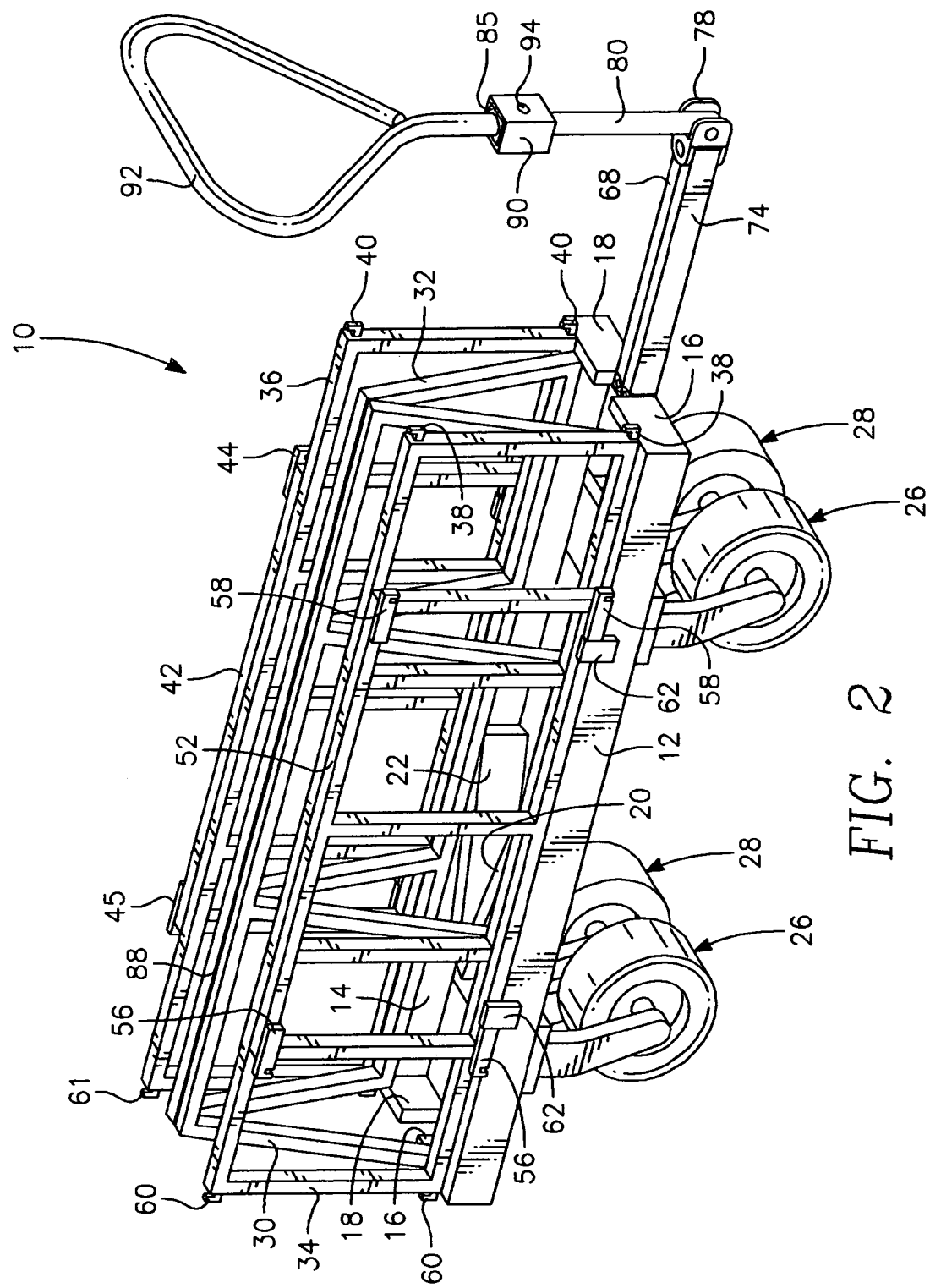
FIG. 2 is an isometric view of the collapsible utility cart of the present invention showing the utility cart in a partially collapsed position.
Figure 3:
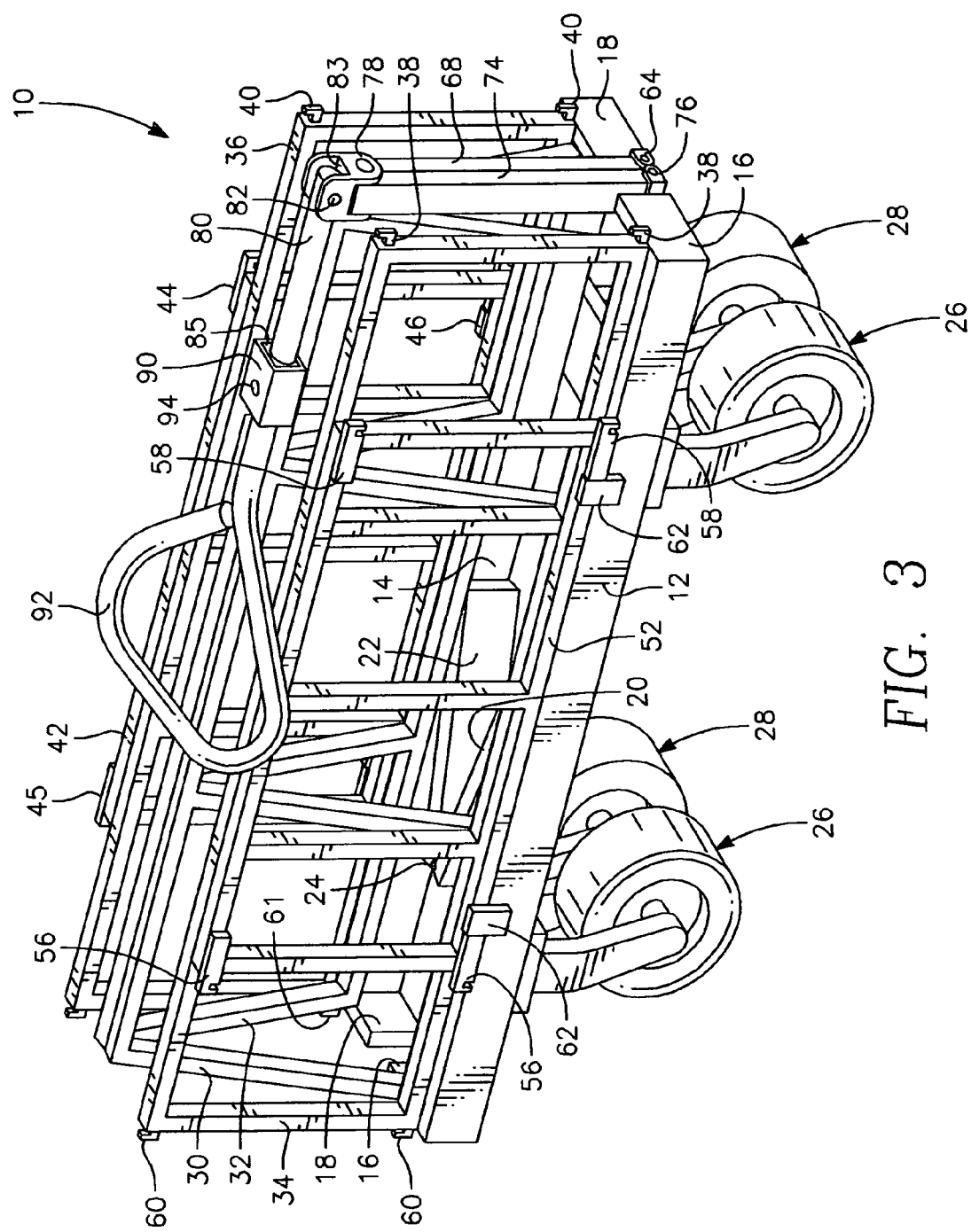
FIG. 3 is an isometric view of the collapsible utility cart of the present invention showing the utility cart in the totally collapsed position.
Figure 4:
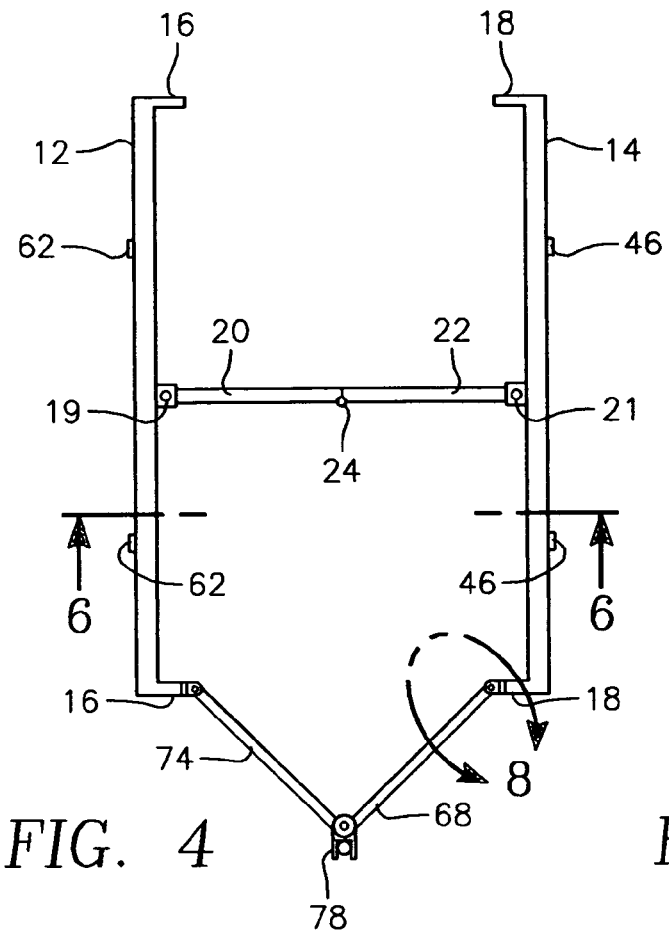
FIG. 4 is a diagrammatic representation generally in a top plan view of the base frame members and the cross brace members that are utilized in conjunction with the collapsible utility cart of the present invention showing the utility cart in the expanded configuration of FIG. 1.

Fixedly attached on the upper surface of the base frame member 12 is a first side panel frame 34. Fixedly mounted onto the upper surface of the base frame member 14 is a similar second side panel frame 36. Side panel frames 34 and 36 are again of the same size and basically in the same configuration. Each of the side panel frames 34 and 36 are constructed to be basically rectangular in shape and constructed of a plurality of elongated bars. The first side panel frame 34 has a forward edge which has integrally mounted thereon a pair of spaced apart protrusions 38. A similar pair of protrusions 40 are mounted on the front edge of the second side panel frame 36. A front panel frame 42 has a pair of spaced apart hooks 44 and 45 mounted at each end edge of the front panel frame 42. The front panel frame 42 is to be placed across the front of the utility cart 10 with each hook 44 connecting with protrusion 38 and hook 45 connecting with protrusion 40. This will securely fix in position the front panel frame 42 relative to side panel frames 34 and 36 when the utility cart is in the expanded or usable configuration, which is shown in FIG. 1 of the drawings. When the utility cart 10 of this invention is in the collapsed position, which is shown in FIGS. 2 and 3, the front panel frame 42 is to be pulled free from its connections with the side panel frames 34 and 36 and then is to be stored against the outside surface of the second side panel frame 36 being held in place thereon by a pair of blocks 46 which are fixedly mounted on the outside surface of the side panel frame 36. It is to be understood that the front panel frame 42 will be constructed similarly on a basic rectangular shape of a plurality of rigidly interconnected bars which will be covered with a metal or plastic screening 48. Both of the side panel frames 34 and 36 will also be covered with a similar type of screening 50.

There is a rear panel frame 52 which is again constructed of a plurality of rigid interconnected bars having a basically rectangular shape and covered by a metallic or plastic screening 54. Mounted on the left side edge of the rear panel frame 52 are a pair of spaced apart hook members 56. A similar pair of hook members 58 are mounted at the right side edge of the rear panel frame 52. Fixedly mounted on the aft edge of the first side panel frame 34 are a pair of protrusions 60. Fixedly mounted on the aft edge of the second side panel frame 36 are a pair of protrusions 61. The rear panel frame 52 can be stowed alongside the outside surface of the first side panel frame 34 and be held in place by a pair of blocks 62 which are fixedly mounted to the first base frame member 12. Blocks 62 are basically similar to blocks 46 which are fixedly mounted onto the second base frame member 14. The rear panel frame 52 is to be removed from its stowage position shown in FIGS. 2 and 3 and placed across the rear portion of the utility cart with each hook member 56 connecting with a protrusion 61 and each hook member 58 connecting with a protrusion 60 and the rear panel frame 52 extending between the side panel frames 34 and 36. The thus formed utility cart 10 shown in FIG. 1 has a top edge which is formed by the free upper edge of each of the frames 34, 36, 42 and 52. The bottom frame members 30 and 32 form in essence a bottom panel that forms the bottom surface of the utility cart 10.

Figure 8:
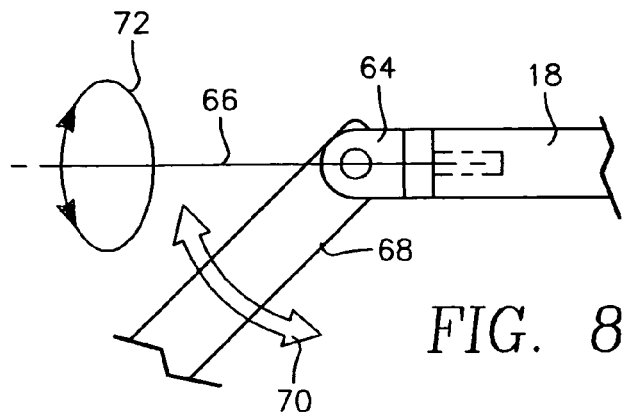
FIG. 8 is an enlarged view of the joint connecting between one of the handlebars and one of the base frame members of the collapsible utility cart of the present invention taken along line 8—8 of FIG. 4.
Figures 9, 10:
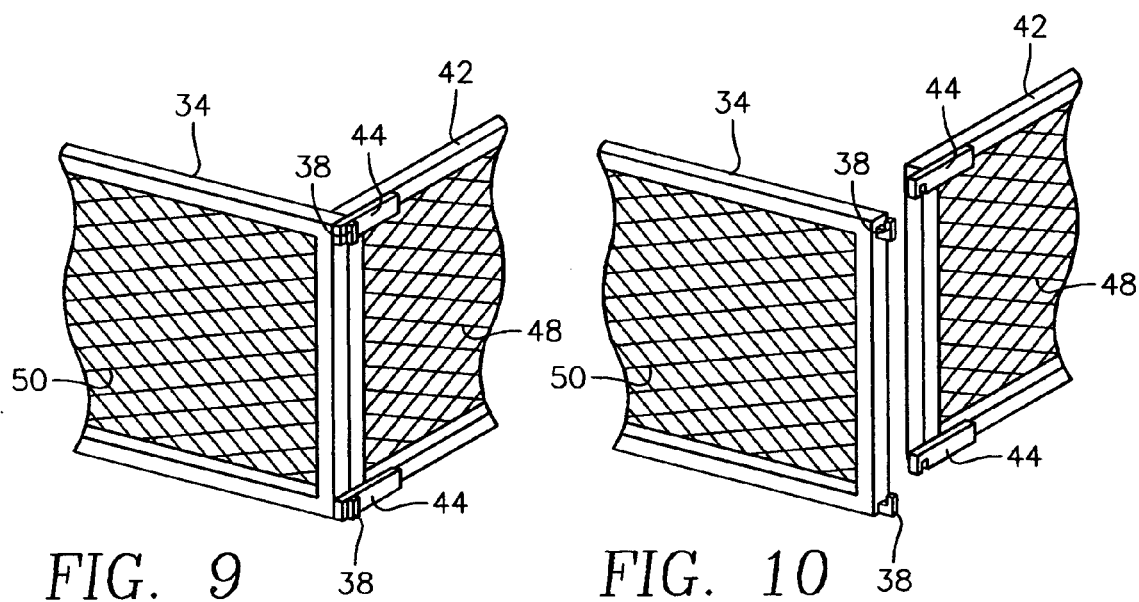
FIG. 9 is a view between the front panel and one of the side panels of the collapsible utility cart of the present invention showing the mounting arrangement therebetween.
FIG. 10 is a view similar to FIG. 9 of the collapsible utility cart of the present invention but showing the front panel disengaged from the side panel.

The end 18 at the forward edge of cart 10 has a connector 64 pivotally attached thereto with the connector 64 being permitted to pivot about a first horizontal axis 66. Note particularly FIG. 8. Pivotally mounted to the connector 64 is a first bar 68 with this bar 68 capable of pivotable movement relative to the connector 64 about a first vertical axis that is perpendicular to axis 66. The bar 68 is capable of pivoting movement in the direction of arrow 70 while the connector 64 and also bar 68 are capable of pivoting movement in the direction of arrow 72 relative to the end 18.

Figure 11:
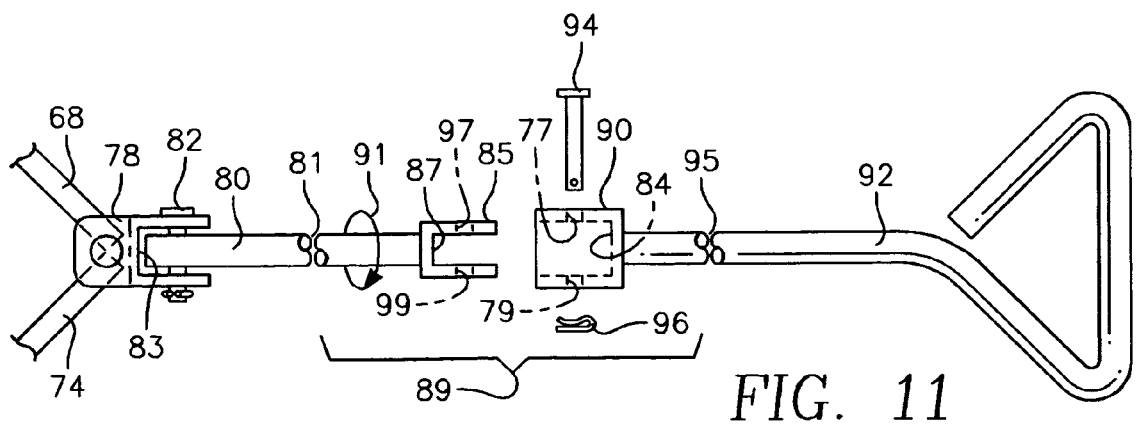
FIG. 11 is an exploded view of the handle structure of the present invention with the handle cut and rotated ninety degrees relative to its mounting connector in order to see clearly the structural details of the handle structure.

In a similar manner, second bar 74 is pivotally connected about a second horizontal axis to a connector 76 which in turn is pivotally connected about a second vertical axis that is perpendicular to the second horizontal pivot axis relative to end 16. The first horizontal axis is parallel to the second horizontal axis. The result is the bars 68 and 74 can be located in an extended position where the bars 68 and 74 can assume an almost right angle configuration relative to their longitudinal dimensions, which is shown in FIG. 1, and can also be located abutting each other but still extended when the utility cart 10 is in the collapsed position as shown in FIG. 2. The bars 68 and 74 in FIG. 2 extend outwardly from the utility cart 10 but the bars 68 and 74 are capable of pivoting up against the forward edge of the utility cart 10, as shown in FIG. 3, due to pivoting occurring about the first and second horizontal axes. The outer end of each of the bars 68 and 74 are pivotally connected together by a handle connector 78. Mounted on the handle connector 78 by pin 82 is a lower handlebar 80. Pin 82 provides a third horizontal axis for pivoting movement of lower handlebar 80. This third horizontal axis is perpendicularly oriented to the first and second horizontal axes. The pin 82 passes through bifurcated opening 83 formed in connector 78. Lower handlebar 80 is formed at its outer end in a U-shaped bracket 85. U-shaped bracket 85 has a flat inside surface 87. Flat surface 84 of a connector 90 is to abut against surface 87 preventing pivotable movement between lower handlebar 80 and upper handlebar 92. Pin 94 secures connector 90 to bracket 85 by pin 94 passing through holes 97 and 99 formed in bracket 85. Pin 94 passes through holes 77 and 79 of connector 90. Cotter pin 96 secures the pin 94 in place. Upper handlebar 92 can be disengaged from bracket 85 by removing of pins 94 and 96 which will permit bracket 85 to be secured to a tractor hitch (not shown). In FIG. 11, the pin 94 appears to be mounted horizontal. Actually, it is vertical. Bracket 85 has to connect with a strap shaped protrusion of a trailer hitch and to pin 94 is "dropped in" to connect with the strap of the trailer hitch. In FIG. 11, the lower handlebar 80 is cut at 81 and the upper handlebar 92 is cut at 95 and U-shaped bracket 85, in area 89, is rotated ninety degrees (depicted by arrow 91) in order to clearly observe the inside of connection 90 and cotter pin 96.

When the bars 68 and 74 are located in the abutting position and directly adjacent the front edge of the utility cart 10, the handle assembly formed by lower handlebar 80 and upper handlebar 92 can be pivoted over and rest on the top edge of the utility cart 10, as shown in FIG. 3 which is the retracted position. The overall result when in the collapsed position shown in FIG. 3 the utility cart 10 assumes a minimal amount of space facilitating stowage. The handle connector 78 can be referred to as a mid-joint which connects the bars 68 and 74.

With the utility cart 10 in the position shown in the expanded or usable configuration, which is shown in FIG. 1, the collapsible utility cart 10 can be readily pulled by an individual by using upper handle member 92 and is capable of being rolled by caster wheel assemblies 26 and 28 to any desirable position. An appropriate load would be contained within the internal compartment of the collapsible utility cart 10 which is enclosed by the side panels 34 and 36 and the front panel frame 42 and the rear panel frame 52.

Figure 5:
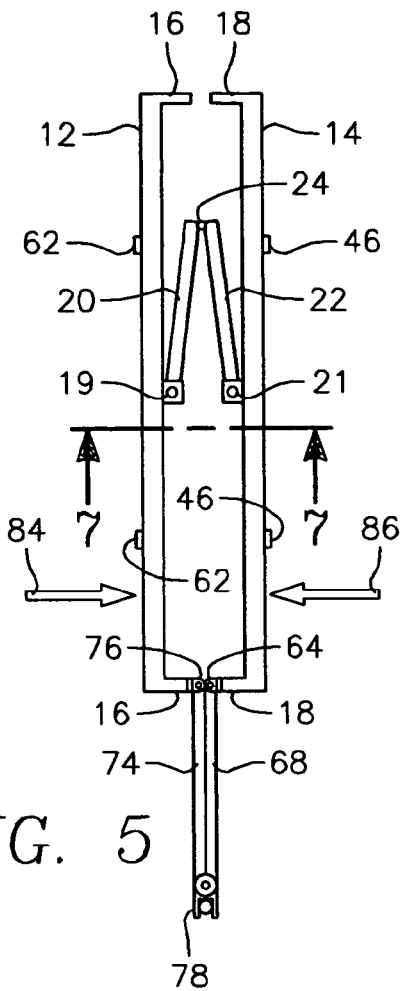
FIG. 5 is a view similar to FIG. 4 but showing the same members in their position when the collapsible utility cart is in the position shown in FIG. 2.
Figure 6:
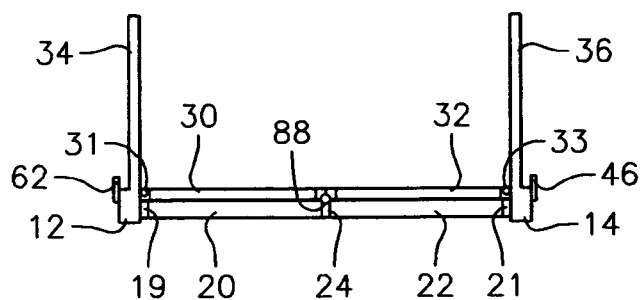
FIG. 6 is a cross-sectional view of the collapsible utility cart of the present invention taken along line 6—6 of FIG. 4.
Figure 7:
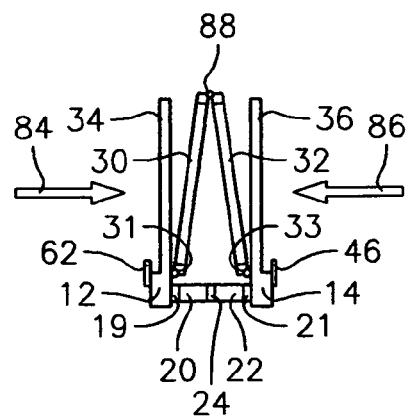
FIG. 7 is a cross-sectional view of the collapsible utility cart of the present invention taken along line 7—7 of FIG. 5.

Let it now be assumed that the user wishes to move the collapsible utility cart 10 to the collapsed position shown in FIG. 3. The user first removes the front panel frame 42 and mounts it in its stowage position directly against the side panel frame 36. The user then proceeds to disengage the rear panel frame 52 and mount such directly against the first side panel frame 34. The user then applies a slight force at the pivot joint 24 which will cause the cross brace members 20 and 22 to assume a slight angular configuration relative to each other. The user can then move the first base frame member 12 toward the second base frame member 14 which will result in the cross brace members 20 and 22 being located substantially side-by-side and also the bars 68 and 74 being located side-by-side. The movement of the base frame members 12 and 14 toward each other is represented by arrows 84 and 86 in FIGS. 5 and 7. During this movement, the bottom frame members 30 and 32 pivot about their hinge axis 88 until the bottom frame members 30 and 32 are also located substantially side-by-side abutting each other. The bottom frame members 30 and 32 will be located between the side panel frames 34 and 36. As previously mentioned, the handle 80 is then pivoted to rest against the top edge of the collapsible utility cart 10 which comprises a retracted position.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative of a broader function or of a great variety of alternative or equivalent elements. Again, these are implicitly included in this disclosure.

Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A collapsible utility cart comprising:
    a bottom panel composed of a first base frame member and a second base frame member and a first bottom frame member and a second bottom frame member, said first bottom frame member being pivotally attached to said first base frame member, said second bottom frame member being pivotally attached to said second base frame member, said bottom panel being movable between an extended position and a collapsed position, said first bottom frame member being aligned with said second bottom frame member when in said extended position, said first bottom frame member being side-by-side with said second bottom frame member when in said collapsed position;
    a plurality of wheels mounted on said base frame members;
    a first side panel frame attached to said first base frame member, a second side panel frame attached to said second base frame member, said first side panel frame being spaced a maximum distance from said second side panel frame when in said extended position, said first side panel frame located side-by-side with said first bottom frame member and said second side panel frame located side-by-side with said second bottom frame member when in said collapsed position; and
    a handle assembly defined as follows: a first bar mounted about a horizontal axis to said first base frame member, a second bar mounted about said horizontal axis to said second base frame member, outer ends of both said first bar and said second bar being mounted to a connector, when in said extended position said first bar forming an approximate right angle with said second bar, when in said collapsed position said first bar being in juxtaposition with said second bar with both said first bar and said second bar capable of being located against said first bottom frame member and said second bottom frame member.

2. The collapsible utility cart as defined in claim 1 wherein:
    said first bottom frame member being identical in size to said second bottom frame member.

3. The collapsible utility cart as defined in claim 1 wherein:
   said first side panel frame being identical in size to said second side panel frame.

4. The collapsible utility cart as defined in claim 1 wherein:
   said handle assembly includes an upper handlebar pivotally mounted about a second horizontal axis by said connector to said first bar and said second bar, when in said collapsed position said upper handlebar is located in a retracted position resting on a top edge of said collapsible utility cart.

5. The collapsible utility cart as defined in claim 4 wherein:
   said first horizontal axis being parallel to said second horizontal axis.

\* \* \* \* \*